Jan. 19, 1932.  A. R. SIMON  1,841,986
VISOR AND SUPPORTING AND OPERATING MECHANISM THEREFOR
Filed April 6, 1928  3 Sheets-Sheet 2
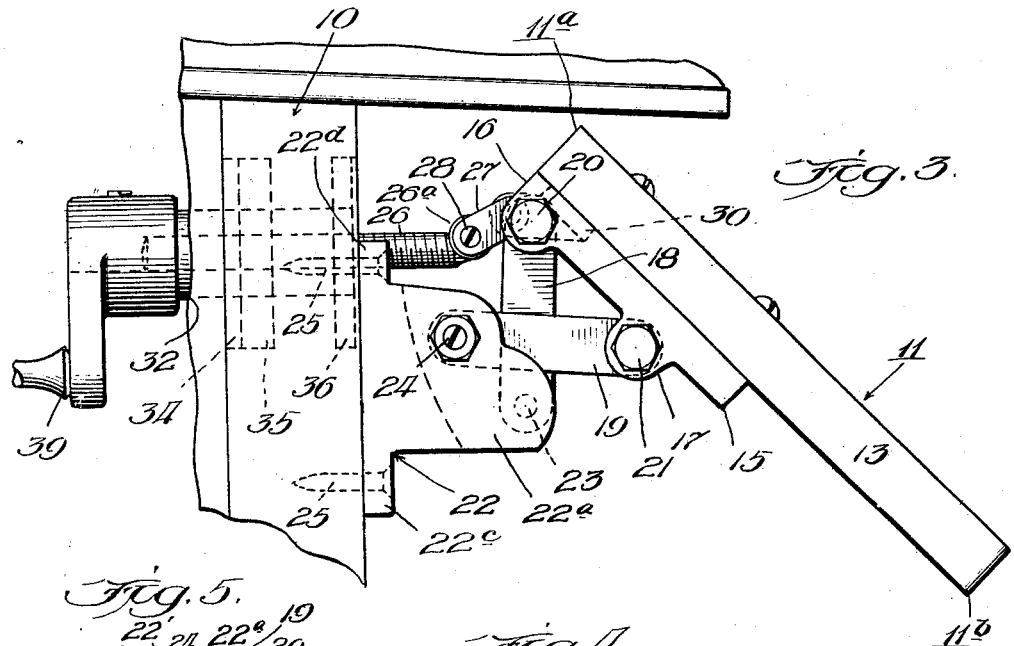
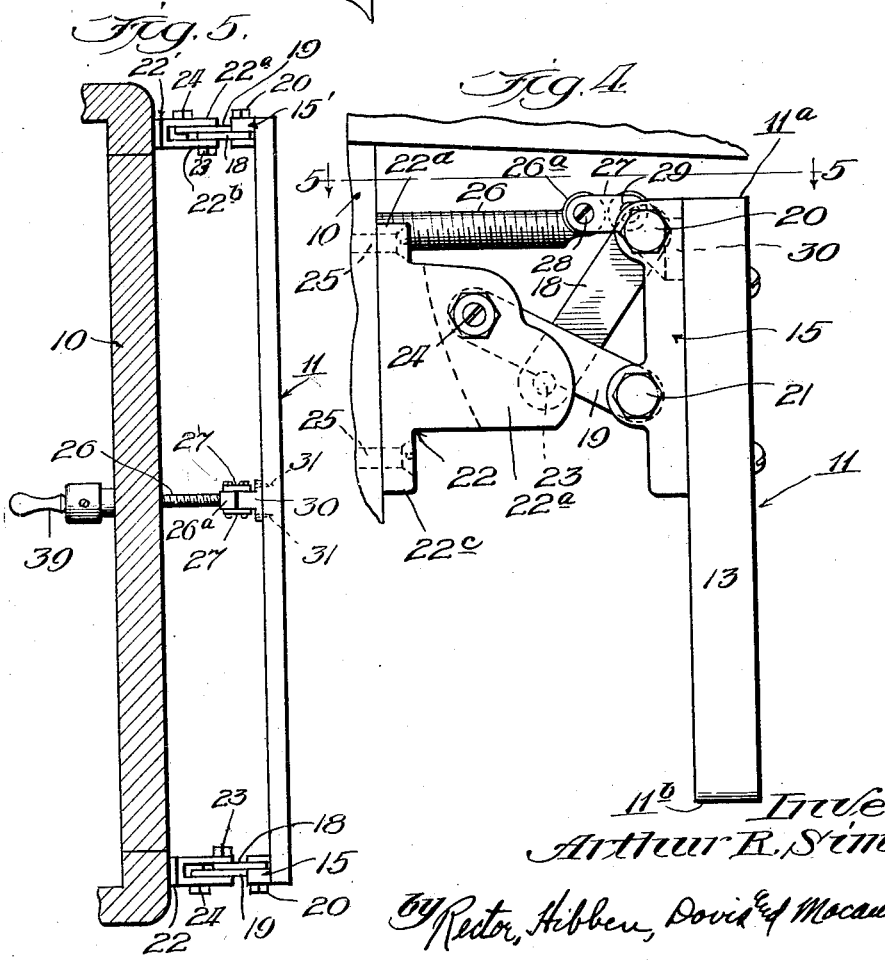
Inventor:
Arthur R. Simon
By Rector, Hibben, Davis & Macauley Attys Jan. 19, 1932.  A. R. SIMON  1,841,986
VISOR AND SUPPORTING AND OPERATING MECHANISM THEREFOR
Filed April 6, 1928   3 Sheets-Sheet 3
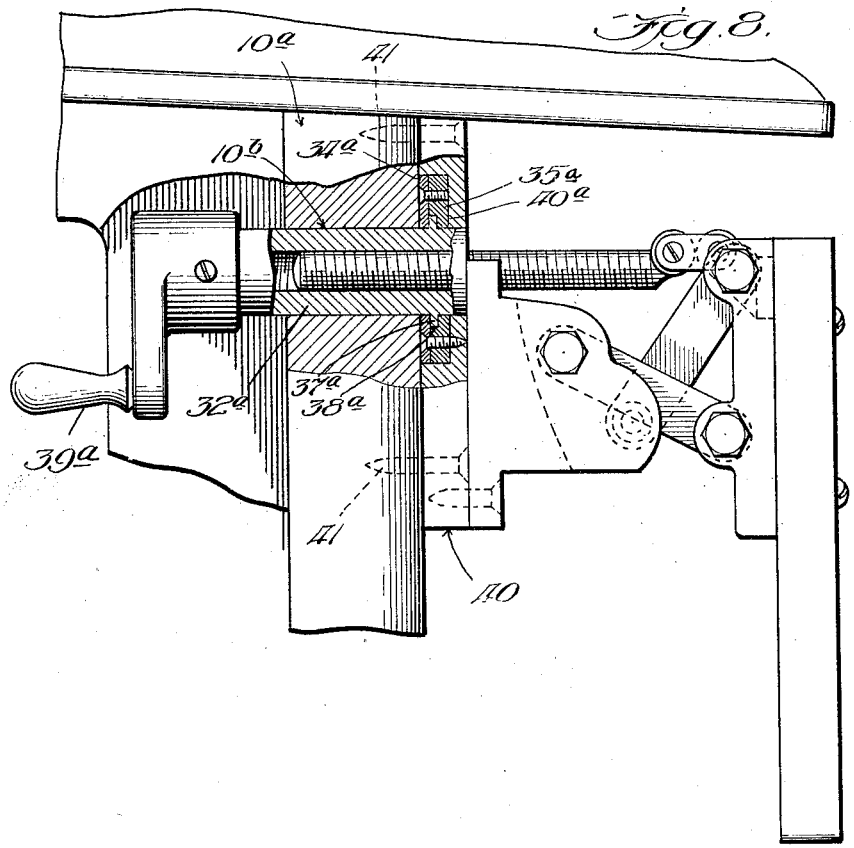
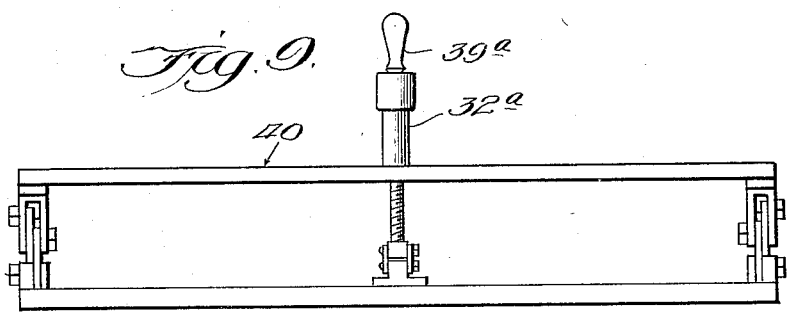
Inventor:
Arthur R. Simon.
Rector, Hibben, Davis & Macauley
Attys Patented Jan. 19, 1932

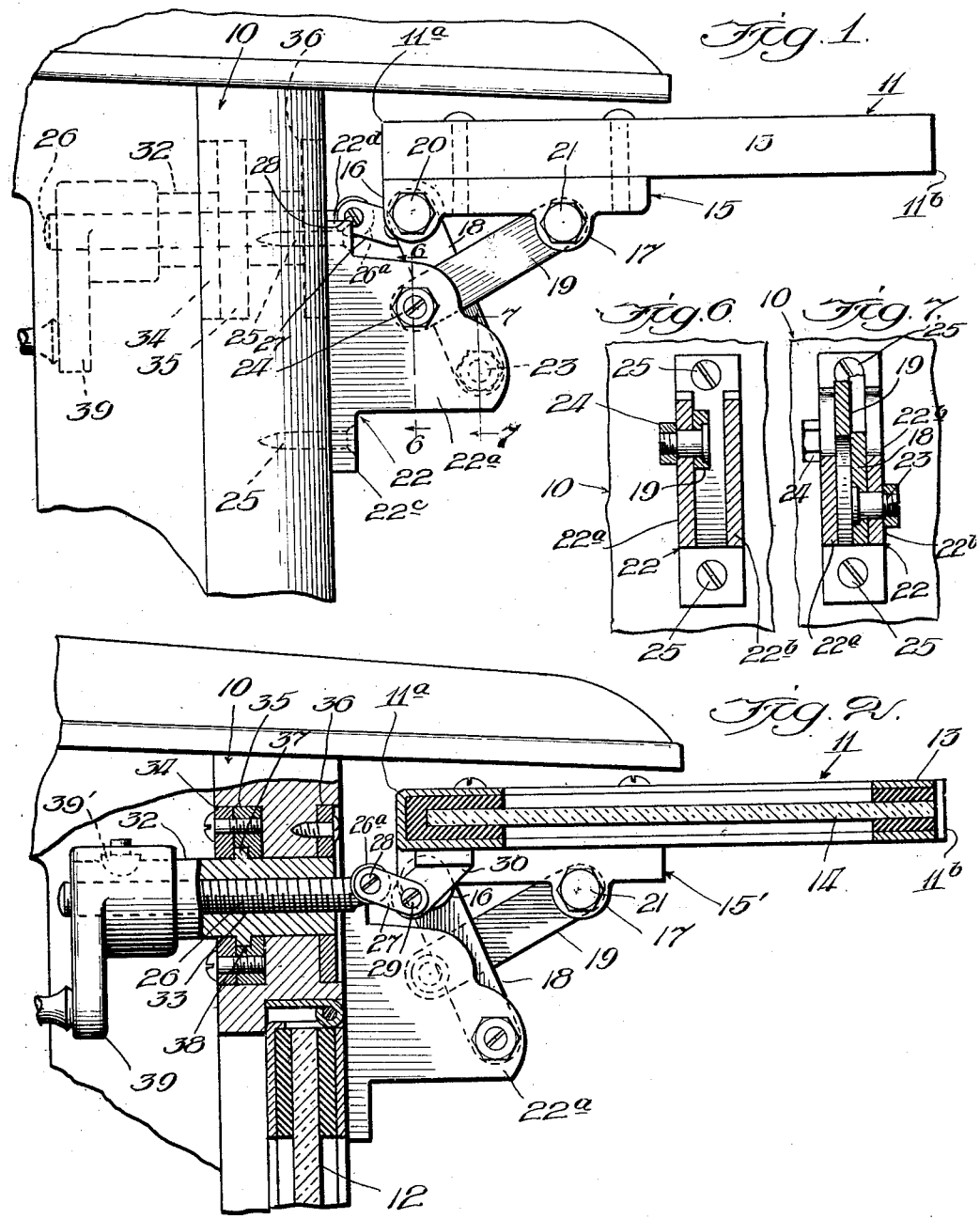

1,841,986

UNITED STATES PATENT OFFICE

ARTHUR R. SIMON, OF LA PORTE, INDIANA

VISOR AND SUPPORTING AND OPERATING MECHANISM THEREFOR

Application filed April 6, 1928. Serial No. 267,824.

My invention relates generally to visor structure for motor (and other) vehicles and has to do especially with a novel form of supporting and operating mechanism therefor.

It is well-known that great discomfort is occasioned by the operator and occupants of motor vehicles due to the lights of approaching vehicles during night driving, and due to road-surface glare and bright sunlight during day driving. Such conditions not only make operation and control of the vehicle very difficult and tiresome, but also result, at times, in serious accidents by collision and loss of control of the vehicles. The forms of visor structure customarily employed neither overcome or appreciably relieve these conditions because of lack of the ability to be adjusted at will to accommodate the same to the varying light and glare, and other conditions which unavoidably exist from time to time during the operation of the vehicle.

The main object of my invention is to provide a highly efficient visor structure which is conveniently adjustable at will from the interior of the vehicle over the full vision-range of the operator and occupants, and which is adapted to eliminate all of the undesirable features of prior visor structures.

Another object is to provide a visor structure which may be applied to and detached from the vehicle body as a self-contained unit without changing or marring the vehicle body, or without detaching any of the vehicle parts. Thusly, my invention provides a visor structure, having the foregoing beneficial characteristics, which may be independently sold and installed as an accessory unit, and which is of such a character that installation of the same may be made easily and quickly without resorting to skilled labor.

A further object is to provide a visor structure including a visor member which is rigidly supported in all positions of adjustment, the support being of such character as to render the visor capable of withstanding maximum wind pressure without distortion or breakage. More particularly, I employ, at the opposite sides of the visor, crossed motion-support links pivotally associated, respectively, with the inward edge of the visor and to a mid-portion thereof, and the vehicle body, whereby strains, stresses and vibration are rigidly opposed along vertical and horizontal lines in all positions of adjustment of the visor. This arrangement also, at all times, prevents rattles and other noises which may tend to annoy the vehicle occupants as well as result in excessive wear and breakage.

Another object is to provide a visor adapted to be moved bodily with ease and rapidity through a fixed path from an extreme "up" to an extreme "down" position, and vice versa. In the carrying out of this object I provide, in part, visor motion-support means of such character that the inward end of the visor is caused to move in an arcuate path backwardly and forwardly relative to the vehicle body with a horizontal displacement relatively greater than its vertical displacement, and the mid-portion of the visor is caused to move with a vertical displacement relatively greater than its horizontal displacement as the inward end of the visor is moved.

Still another object is to provide a visor structure having an exceedingly simple actuating mechanism for controlling the movement of the visor upon and about the above motion-support links, and which may be readily and quickly associated with the interior of the vehicle body.

An additional object is to provide a visor structure embodying all of the foregoing desirable features which is exceedingly simple in construction, cheap to manufacture, embodies but a very few working parts, and which is exceedingly strong and durable. It may be applied to cars already in use as readily as to cars in the course of manufacture with all the foregoing attendant advantages.

A further object is to provide supporting and actuating structure for the visor member which is adapted, in all positions, to bodily suspend and carry the visor member in spaced relation to the body and windshield, so as to not interfere with the mounting of devices (such as windshield wiper, etc.) exteriorly on the body adjacent thereto.

Additional objects are to insure such adjustment of the visor that the light rays in passing through the transparent portion thereof will always be clear without distortion of images; to provide a unitary structure which is compact and neat in appearance; to provide a structure which may be readily applied to any make of vehicle; to provide vision-protection means which may be adjusted with the rapidity required to meet rapidly changing light conditions which may exist as the vehicle moves along; and to provide vision-protection means which makes the driving of motor vehicles safer at all times, and which practically eliminates accidents due to blinding lights and sun glare.

Other objects and advantages will become apparent as this description progresses and by reference to the drawings wherein I have shown my invention applied to the forward part of the automobile body, and operatively associated with the front windshield thereof to shield the forward vision of the operator and occupants of the car.

In the drawings:

Figure 1 is a side elevation of the upper forward portion of the vehicle showing my invention applied thereto. In this view the visor member is shown in an "up" or horizontal-plane position;

Fig. 2 is a view somewhat similar to Fig. 1 except showing a portion of the forward part of the vehicle body and the visor structure is shown in vertical section;

Fig. 3 is a view similar to Fig. 1, but showing the visor and its supporting and operating mechanism in an intermediate position;

Fig. 4 is still another view similar to Fig. 1 except showing the visor member and its supporting and operating mechanism in a "down" or vertical-plane position;

Fig. 5 is a reduced plan section taken substantially at the position of line 5—5 of Fig. 4;

Fig. 6 is a transverse vertical section through the visor supporting bracket, taken substantially on line 6—6 of Fig. 1;

Fig. 7 is another transverse vertical section of the bracket of Fig. 6, taken substantially on line 7—7 of Fig 1;

Fig. 8 is a side elevation, partly in section, showing the manner of mounting my visor structure upon a detachable panel which, in turn, is adapted to be attached to the forward part of the vehicle body, and illustrating the manner of associating the visor member with an actuator projecting into the interior of the automobile body at a place convenient to the operator; and Fig. 9 is a reduced detached plan view of the visor unit shown in Fig. 8.

In Figs. 1 to 7, inclusive of the drawings, I have shown the visor structure attached directly to the upper forward portion 10 of a conventional form of automobile body, and at such a point that the visor 11 may be adjusted to various positions above and down in front of the windshield structure 12 which may take the form shown in Fig. 2, or any other desired form. It will be understood that the visor unit may also be applied directly to a separate and detachable panel without departing from my invention, as will be described more fully in connection with Figs. 8 and 9.

The visor unit includes the visor member 11 consisting of a rectangular, channeled frame 13 supporting the colored glass 14, the entire member being of any suitable thickness and of sufficient width to extend entirely across the front of the body and windshield 12. This visor is also of sufficient length to properly shade the forward vision of the occupants of the automobile, from any position therewithin, under the various operating conditions. It will be appreciated that while my invention is primarily adapted for front vision protection, it may well be applied to the vehicle body in such a way as to protect the occupants from light effects through the side or rear windshields or windows of the automobile, and an opaque panel may be substituted for the glass 14 in case, and under conditions, where such substitution would be permissible.

There will be times when visor protection is not required and, in that case, the visor 11 may be swung upwardly above the windshield 12 to the position shown in Fig. 1, or it may be moved even still further upwardly as desired. There will also be times during night driving, and during day driving, when light-glare conditions are such that the entire range of vision should be shielded to insure safety and comfort for the automobile occupants, and to take care of these conditions, I provide for swinging the visor to the position shown in Fig. 4. In other instances, as when driving toward the setting sun, it may not be necessary to move the visor member to its extreme vertical position, in which case the visor may be swung to an intermediate position, such as indicated in Fig. 3. Of course, the visor 11 may also be adjusted to this latter position under night-driving and other day-driving conditions.

My invention enables the operator to make the foregoing adjustments easily and quickly from within the interior of the vehicle. To this end, I employ a novel form of visor supporting and operating mechanism. More particularly, the visor 11 is provided at its opposite sides (adjacent its inward end) with comparatively long brackets 15, 15' (Fig. 5), each of which is provided with spaced bifurcate pivot lugs 16 and 17, having aligned openings therein, for pivotally receiving one end of the respective crossed-supporting and motion-controlling links 18 and 19, the pivotal connection being effected by the respective pivot bolts 20 and 21. The other ends of these links 18 and 19, at the opposite sides of the visor, are pivotally secured between the jaws 22ᵃ and 22ᵇ of the bifurcate brackets 22, 22′, by the respective pivot bolts 23 and 24. The brackets 22, 22′ are provided with flanges 22ᶜ and 22ᵈ, having openings therein adapted to receive fastening devices, such as the screws 25, for securing the same rigidly in place upon the adjacent end portion or the front part 10 of the body adjacent the side edges of the windshield.

The visor motion-controlling and supporting mechanism, while being very flexible in operation, is of such character that the visor is rigidly carried in any and all positions to which it may be adjusted; it will withstand maximum wind pressures, road-surface shocks, vibration, etc., without distortion and breakage; and will not develop rattles and other noises. More specifically, with reference to Figs. 1 to 4, inclusive, I pivot one end of the link 18 to the inward edge of the visor and the adjacent end of the link 19 is pivoted to a mid-portion of the visor. The pivots at the opposite ends of these links are off-set horizontally and vertically, the pivot for that end of the link 19 being closer to the body wall 10. Thusly, the link 18 assumes and remains in a generally vertical position with the link 19 in a generally horizontal position, and such links cross each other at approximately right angles. While this right-angled crossing-relation is a preferred relation between these links, it is to be understood that such relation may be varied to a considerable extent, but never to such an extent that the links are parallel. With this arrangement of the links, the link 18 gives to the inward edge 11ᵃ of the visor a relatively greater horizontal displacement with respect to its vertical displacement, and the link 19 gives to the mid-portion of the visor a relatively greater vertical displacement with respect to its horizontal displacement with the result that the outward edge or end 11ᵇ of the visor (and the visor as a whole) is caused to move upwardly and downwardly and inwardly and outwardly with great rapidity when the inward end 11ᵃ of the visor is moved backward and forward. The horizontal movement of the inward visor end 11ᵃ may be varied by varying the lengths of the links proportionately, or by varying the extent of thrust on such inward end, or by varying the positions of the pivots 23 and 24. The movement of the visor mid-portion and, consequently, the outward end 11ᵇ can likewise be varied by varying the length of link 19 and/or the position of its pivot 24. If the link 19 is shortened, the bodily inward movement of the visor takes place more quickly with the same forward movement of the inward edge thereof, and vice versa. In addition to the foregoing motion-control, it will be obvious that the crossed links rigidly support the visor 11 against vertical, horizontal and other strains, stresses and loads caused by wind pressure, vibration, etc., in all positions (see Figs. 1, 3 and 4).

The means for moving the inward end 11ᵃ of the visor backward and forward takes the form of an adjusting screw 26 (Fig. 2) having a head 26ᵃ on its forward end adapted to be pivotally connected to a pair of short spaced motion-compensating links 27 by a pivot pin 28. The opposite ends of these links 27 are pivotally connected by a pivot pin 29 to a lug 30 attached to the central portion of the inward end of visor frame 13 by suitable fastening devices, such as the screws or rivets 31 (Fig. 5). The screw 26 is adapted to travel horizontally in a fixed path and the links 27 compensate for the obvious vertical displacement of the inward end 11ᵃ of the visor in a manner well understood. It will be understood that this compensating connection may take any other desired form, such as a slot-and-pin connection; a flexible connector; or a universal support for the adjusting screw 26, etc.

The adjusting screw 26 is caused to travel in its fixed horizontal path by means of a rotatable sleeve 32 having a threaded bore 33 which receives the screw 26. This sleeve 32 is rotatably supported by a plurality of bearing members 34, 35 and 36, the latter two members being spaced apart to afford a rather wide support. The sleeve is provided, at an intermediate point, with a circumferential flange 37 which extends into a groove 38 between the bearing members 34 and 35. The bearing members 34, 35 and 36 are fixed in the body portion 10 (Fig. 2) in such a way that the sleeve is confined against movement in any direction, except rotation, whereby, as this sleeve is rotated, the screw 26 is moved forwardly or rearwardly, depending upon the direction of rotation of the sleeve handle 39 which is secured thereto as by a key 39′. The character of the threads of the sleeve bore and the screw 26 are, preferably, such (as will be readily understood) as to cause the screw to move backwardly and forwardly very rapidly; but, of course, this screw thread arrangement may be varied in form and size to effect the rate of movement desired. The operating handle 39 is located on the interior of the body within convenient reach of the operator.

The operation of my visor structure is believed obvious from the foregoing. It may be stated generally as follows: As the handle 39 is rotated in an anti-clockwise direction, the screw 26 moves forwardly, moving the inward end 11ᵃ of the suspended visor forwardly in an arcuate path. During this movement the mid and lower portions of the visor travel downwardly and inwardly in a rapid manner as hereinbefore explained. The handle may be actuated to swing the visor bodily as stated, from the position of Fig. 1 to that of Fig. 4 or to an intermediate position, such as that shown in Fig. 3. When the handle is operated in the reverse direction, the visor is swung in a like manner in the opposite direction.

From the foregoing it will also be readily seen that my visor structure, while very efficient, is exceedingly simple in construction and may be readily and quickly applied to an automobile. To install the structure upon the automobile, all that is required is to attach the brackets 22, 22′ at the desired position and provide a suitable opening in the upper front part or panel 10 of the automobile for receiving the adjusting sleeve 32 and its bearing. This can be very readily done without in any way injuring or marring the car body. The owner of the automobile may install the structure without resorting to the aid of a skilled mechanic. The structure is also of such character that it may well be furnished to the public as a self-contained unit eliminating the necessity of preliminary installation adjustments, and this can be done at a very low cost.

In Figs. 8 and 9, I show my visor structure as applied to a separate and detachable panel 40, the arrangement being such that it is not only self-contained, but is also self-supporting. The panel 40 is provided with bearing members 34ª and 35ª positioned in a recess 40ª in the panel similarly to the bearing sections 34 and 35 of Fig. 2. This eliminates the necessity of mounting the sleeve bearing support within the portion 10ª of the automobile body and further facilitates the mounting of the structure to the automobile. The bearing member 35ª is provided with a recess 38ª similar to recess 38 (Fig. 2) for anchoring the sleeve flange 37ª and the sleeve 32ª. With this arrangement shown in Figs. 8 and 9, to mount the visor unit upon the outer portion of the body, it is necessary only to drill an opening 10ᵇ in the body portion 10ª at the proper position, insert the sleeve 32ª therethrough, attach the panel 40 to the adjacent portion of the body by suitable fastening devices (such as the screws 41), and secure the handle 39ª to the inner end of the sleeve by means of a key or the like, such as that shown in Fig. 2. The remainder of the structure shown in Figs. 8 and 9 is identical with that described in connection with Figs. 1 to 7, inclusive.

It will be understood that the various details of construction and arrangement of the elements of my invention, as illustrated by the preferred embodiment shown in the drawings, may be varied without departing from the spirit and scope of my invention as defined by the claims which follow.

I claim:

1. In visor structure for the body of a vehicle, the combination of a visor, a supporting bracket mounted upon the vehicle body, guide means between said bracket and the inward end of said visor for controlling horizontal and vertical displacement of that end, guide means between said bracket and the mid-portion of said visor for controlling vertical and horizontal displacement of that portion, and means associated with the inward end of said member for moving that end fore and aft to move said member as a whole upon said guide means to move said member from a substantially horizontal position to a substantially vertical position, and vice versa, and to position said member at any point intermediate said horizontal and vertical limits.

2. In visor structure, the combination of a movable visor member, means for supporting said member including a link pivotally connected to the inward edge of said member, another link pivotally connected to another portion of said member, the other ends of said links being supported by pivots fixed in vertical and horizontal offset relation with respect to each other, and means for swinging said member forwardly and backwardly bodily about said links to cause it to travel from a horizontal to a vertical position and vice versa.

3. In a visor structure, the combination of visor member, supporting and motion-controlling means at the opposite side edges of said member, said means including at each side edge a link having one end pivotally connected to the inward portion of the side edge and its other end pivotally connected to a base element, another link having one end pivotally connected to the mid-portion of the side edge and its other end pivotally connected to said base element at a point off-set rearwardly and horizontally and vertically relative to said other base-element pivotal connection, an adjusting device associated with the inward edge of said member, means between said adjusting device and the inward end of said member for compensating for vertical displacement of the inward edge of said member, and means for actuating said adjusting device to move said member backward and forward about said links.

4. In a visor structure, the combination of a movable visor member, brackets at the opposite side edges of said member adapted to be mounted upon the object with which the visor is associated, a link pivoted to each of said brackets and to the adjacent side edge of said member at the inward end thereof, another link pivoted to each of said brackets and to the mid-portion of the adjacent side edge of said member, the pivotal supports for said links upon each bracket being offset vertically and horizontally, so that said links always cross each other, and adjusting means associated with the inward edge of said visor member and the object with which the visor is associated for transmitting outward and inward thrusts to said inward edge to swing said visor member bodily about and upon said links, said means including an extensible member, a device for extending said extensible member, and a connector element between said extensible member and the edge of said visor member compensating for vertical displacement of the inner edge as it is moved.

5. In visor structure, the combination of a movable visor member and supporting and motion controlling means therefor comprising a bracket at each side of the visor member adapted to be carried by the object with which said visor member is associated, a supporting-motion link at each side of the visor member pivotally associated with the adjacent of said brackets and the inward edge of said member, another supporting-motion link pivotally associated with said adjacent bracket and a central portion of said member, a threaded adjusting stem adapted to travel backwardly and forwardly in a fixed horizontal path, a link pivoted to one end of said stem and to the inward edge of said visor member, a sleeve rotatable relative to said stem, but fixed against movement in any other direction, and means carried by said sleeve for rotating the same to move said stem backwardly and forwardly to move the inward edge of said visor member backwardly and forwardly to swing said visor member bodily about and upon said motion supporting-motion links to raise and lower said visor member.

6. In a visor structure, a movable visor member, a supporting bracket adapted to be attached to the vehicle, crossed links at each side edge of the visor which are disposed between and connected to both said bracket and said member for defining the path of movement of said member and for supporting the same rigid as it is moved, and adjusting means associated with the inward edge of said member for moving that end backwardly and forwardly to move said member bodily about said links.

7. In a visor structure, a movable visor member, a support element for said member, crossed levers pivotally connected to both said element and said member for defining the path of movement of said member and for supporting the same rigid as it is moved, and means, including a connector compensating for vertical displacement associated with the inward end of said member, for moving the inward end of the visor backwardly and forwardly to move the same bodily about said levers.

8. In a visor structure, a movable visor member, a support element for said member, links crossed at approximately right angles and pivotally connected to both said element and member, one of said levers being pivoted to the inward edge of said member and the other pivoted to another portion of said member for defining the path of movement of said member and for supporting the same rigid as it is moved, and adjusting means associated with the inward edge of said member for moving that end backwardly and forwardly to move said member bodily about said links.

9. The combination with a vehicle body having a windshield structure, of a visor extending entirely across said windshield in spaced relation thereto and to said body and adapted to be supported and moved bodily from a plane at substantially right angles to the plane of the windshield to a plane substantially parallel with the plane of the windshield, and means for supporting and moving said visor including a pair of crossed links at each side edge of said visor adjacent the inward edge of the latter, the corresponding of which links are pivotally associated with both said visor and said body, and an adjustable actuating member connected to the inward edge of said visor.

10. The combination with a vehicle body having a windshield structure, of a visor extending across said windshield and adapted to be supported and moved bodily from a plane at substantially right angles to the plane of the windshield to a plane substantially parallel with the plane of the windshield, and means for supporting and moving said visor including a pair of links crossed at substantially right angles at the opposite sides of said visor which are each pivotally associated with both said visor and said body so that one link of each pair effects a horizontal displacement of the inward edge of the visor relatively greater than its vertical movement, and the other link of each pair effects a vertical movement of the mid-portion of the visor relatively greater than its horizontal movement, and means for moving the inward edge of said visor to effect said above-mentioned movements.

11. In visor structure, the combination of a visor, a supporting bracket, means associated with the inward edge of said visor for moving that edge backwardly and forwardly, said means including a connection for compensating for vertical displacement of said inward edge, a link carried approximately vertical between said bracket and visor for accommodating horizontal displacement of the inward edge thereof with a relatively short vertical displacement of that end as the inward edge of said visor is moved forwardly, and another link carried approximately horizontal between said bracket and visor and extending across the other link for accommodating a vertical displacement of the mid-portion of said visor and the outward end thereof with a relatively short horizontal displacement of said mid-portion whereby said outward edge is caused to move rapidly from "up" to a "down" position, and vice versa.

12. The combination with a wall portion of a vehicle body which includes a windshield, of a visor unit comprising a detachable cross panel adapted to be mounted exteriorly on said body portion adjacent said windshield, a visor supported in spaced relation to said panel and body portion, motion-support links between said panel and said visor for effecting bodily inward and outward and upward and downward movement of said visor, and means associated with said panel and the inward edge of said visor and movable backwardly and forwardly for effecting said visor movements, including a device projecting through said body portion into the interior of the body for actuation from therewithin.

13. The combination with a vehicle body having a windshield, of a self-contained and detachable visor unit which is detachable from said body without disturbing the self-contained parts of said visor unit, comprising a cross panel adapted to be attached to said body above said windshield, a visor, means supported solely by said panel and connected to said visor for effecting said visor movements, up-and-down means including an adjusting device constituting a part of said visor unit adapted to be associated with the inward end of said visor and to project into said body, said unit being disengageable from said body merely by bodily outward movement thereof, and a removable handle on the inwardly projecting part of said device for moving said visor upon said visor-supported panel.

14. The combination with a vehicle body having a windshield, of a self-contained and detachable visor structure comprising a panel adapted to be attached to said body adjacent said windshield, a visor movable relative to said panel, crossed links having their opposite ends pivotally connected to said panel and to said visor, and means, including a compensator for the vertical displacement of the inward end of said visor, associated with the inward end of said visor for moving that end fore and aft, a part of said means projecting through said body for manipulation from therewithin, and an actuator carried by the inwardly projecting part for controlling said means to cause said visor to swing upon and about said crossed-links.

In testimony whereof, I have subscribed my name.

ARTHUR R. SIMON.